(12) United States Patent
Martens et al.

(10) Patent No.: US 9,986,039 B2
(45) Date of Patent: May 29, 2018

(54) NETWORK FOR MULTIMEDIA CONTROL COMPRISING FUNCTIONAL ENTITIES HAVING PUBLISHER AND/OR SUBSCRIBER FUNCTIONALITY, AND METHOD FOR INITIATING A MULTIMEDIA SESSION

(71) Applicant: THOMSON LICENSING, Issy de Moulineaux (FR)

(72) Inventors: Kristof Martens, Herent (BE); Alex De Smedt, Olen (BE); Karel Van Doorselaer, Edegem (BE); Jurgen Schoeters, Ranst (BE); Dominique Chanet, Aalst (BE); Patrick Goemaere, Brecht (BE)

(73) Assignee: THOMSON LICENSING, Issy les Loulineaux (FR)

( * ) Notice: Subject to any disclaimer, the term of this patent is extended or adjusted under 35 U.S.C. 154(b) by 491 days.

(21) Appl. No.: 14/436,473

(22) PCT Filed: Oct. 14, 2013

(86) PCT No.: PCT/EP2013/071434
§ 371 (c)(1),
(2) Date: Apr. 16, 2015

(87) PCT Pub. No.: WO2014/060361
PCT Pub. Date: Apr. 24, 2014

(65) Prior Publication Data
US 2015/0304429 A1 Oct. 22, 2015

(30) Foreign Application Priority Data

Oct. 16, 2012 (EP) .................................. 12306276

(51) Int. Cl.
*G06F 15/16* (2006.01)
*H04L 29/08* (2006.01)
*H04L 12/24* (2006.01)

(52) U.S. Cl.
CPC ............ *H04L 67/141* (2013.01); *H04L 41/12* (2013.01); *H04L 67/10* (2013.01); *H04L 67/12* (2013.01); *H04L 67/14* (2013.01)

(58) Field of Classification Search
CPC .......... H04L 67/12; H04L 67/10; H04L 41/12
See application file for complete search history.

(56) References Cited

U.S. PATENT DOCUMENTS

2007/0201481 A1 8/2007 Bhatia et al.
2012/0246295 A1 9/2012 Gonzales-Banos et al.

OTHER PUBLICATIONS

Hakiri et al. "A SIP-Based Network QoS Provisioning Framework for Cloud-Hosted DDS Applications" OTM 2011, Part II, LNCS 7045, pp. 507-524, 2011.*

(Continued)

*Primary Examiner* — David Lazaro
(74) *Attorney, Agent, or Firm* — Meagher Emanuel Laks Goldberg & Liao, LLP

(57) ABSTRACT

The network for multimedia control comprises User Interfaces, Session Controllers and Media Endpoints as functional entities for initiating a session, the entities having each publisher and/or subscriber functionality and communicating on topics. The network is in particular a Data Distribution Service for Real-Time Systems (DDS) network and the entities act as Domain Participants of the DDS network for providing multimedia signalling control as a domain of the DDS network.

17 Claims, 11 Drawing Sheets

| Domain Participant | Session State CreateReq | | Session State Req | | Session State | | Media Endpoint Req | | Media Endpoint State | |
|---|---|---|---|---|---|---|---|---|---|---|
| | Pub | Sub | Pub | Sub | Pub | Sub | Pub | Sub | Pub | Sub |
| D1 — Initiating User Interface (iUI) | x | - | x | - | - | x | x | - | - | x |
| D3 — Outgoing Session Controller (oSC) | - | x | - | x | x | x | - | - | - | - |
| D4 — Incoming Session Controller (iSC) | - | x | x | x | x | x | - | - | - | - |
| D2 — TerminatingUser Interface (tUI) | x | - | x | - | - | x | x | - | - | x |
| D5, D6 — Media Endpoint (ME) | - | - | - | - | - | - | - | x | x | - |

Table 1

(56) References Cited

OTHER PUBLICATIONS

Akram Hakiri: "A SIP-Based Network QoS Provisioning Framework for Cloud Hosted DDS Appl"; Jan. 1, 2011; Springer Berlin Heidelberg; pp. 507-524.
ATIS: "Service Oriented Networks (SON) Assessment"; ITU; Study 2009-2012; Geneva; pp. 1-184.
Search Report dated Jan. 20, 2014.

* cited by examiner

| Domain Participant | Session State CreateReq | | Session State Req | | Session State | | Media Endpoint Req | | Media Endpoint State | |
|---|---|---|---|---|---|---|---|---|---|---|
| | Pub | Sub | Pub | Sub | Pub | Sub | Pub | Sub | Pub | Sub |
| Initiating User Interface (iUI) | x | - | x | - | - | x | x | - | - | x |
| Outgoing Session Controller (oSC) | - | x | - | x | x | x | - | - | - | - |
| Incoming Session Controller (iSC) | - | x | x | x | x | x | - | - | - | - |
| Terminating User Interface (tUI) | x | - | x | - | - | x | x | x | - | x |
| Media Endpoint (ME) | - | - | - | - | - | - | - | x | x | - |

Fig. 4: Table 1

NETWORK FOR MULTIMEDIA CONTROL COMPRISING FUNCTIONAL ENTITIES HAVING PUBLISHER AND/OR SUBSCRIBER FUNCTIONALITY, AND METHOD FOR INITIATING A MULTIMEDIA SESSION

This application claims the benefit, under 35 U.S.C. § 365 of International Application PCT/EP2013/071434, filed Oct. 14, 2013, which was published in accordance with PCT Article 21(2) on Apr. 24, 2014 in English and which claims the benefit of European patent application No. 12306276.2, filed Oct. 16, 2012.

TECHNICAL FIELD

The invention relates to the field of communications networks, for example to home network including a residential gateway, adapted to operate via a broadband connection with a service provider network.

BACKGROUND OF THE INVENTION

Residential gateways are widely used to connect devices in a home of a customer to the Internet or to any other wide area network (WAN). Residential gateways use for example digital subscriber line (DSL) technology that enables a high data rate transmission over copper lines, or use optical fiber broadband transmission systems, e.g. fiber-to-the-home (FTTH) or fiber-to-the premises (FTTP).

Home networks have become part of everyday life for many customers. A home network consists of a range of heterogeneous devices, which means that the home network is made up of different kinds of devices. All these devices need to communicate with each other. For this interconnection, multiple solutions are available: The home network uses a mixture of solutions, such as wireless and wired network connections. Combining these devices creates a network that allows users to share information and control devices in the home. Examples of networked devices in the home are for example residential gateways, set-top boxes, TVs, personal computers, tablet PCs, smart phones, network-attached storage (NAS) devices, printers and game consoles.

DDS (Data Distribution Service for Real-Time Systems) is a standard governed by the Object Management Group (OMG). It describes a data-centric publish-subscribe middleware that can be used to build distributed real-time systems. Since its formal adoption as an OMG standard in the year 2004 it has become a popular technology used in many different industries such as the airline/aviation industry, the automotive industry, the military . . . . Several commercial and open-source implementations of the DDS standard exist. To allow these different DDS implementations to interoperate, they must implement a second OMG standard, called the Real-Time Publish-Subscribe Wire Protocol-DDS Interoperability Wire Protocol (DDSI) Specification. DDSI specifies how DDS entities (Domains, Participants, Publishers, Subscribers, Readers, Writers, Topics, . . . ) are mapped to DDSI entities (domains, participants, endpoints and optionally topics), the format of the messages that are exchanged between the participants/endpoints, and also valid message sequences of message exchanges between participants/endpoints as well as a mechanism for discovering other participants and endpoints within a DDS domain. The latest version of DDS is currently the version v1.2 and the latest version of the Real-Time Publish-Subscribe Wire Protocol (DDSI) is the version v2.1, which are both published by the OMG on its Internet site under www.OMG.org.

It is the object of the invention, to provide a DDS-based network and DDS-based methods for setting up a multimedia session containing multimedia connections. The DDS-based network is for example a home network including a multitude of devices enabled for DDS, as depicted in FIG. 1a. When leaving a DDS distributed network, classical methods for signalling may be applied, and interoperation entities may be present as needed. Also interoperation of the DDS network with other DDS based islands being connected via a non-DDS network may be applicable, as shown in FIG. 1b. Known signalling systems for setting up media sessions in an Internet Protocol (IP) environment are SIP, H.323, MGCP, Megaco, etc. These systems have the following characteristics:

They are using action based messages.
They are working on functions (protocol entities), that change (session) state based on the requested actions.
The control communication for setting up sessions is between dedicated entities, preconfigured or not.
A signalling control communication for setting up sessions ripples through multiple entities in the network.

In a DDS environment, which is basically Publish/Subscribe based, the message approach, where a message is sent between dedicated entities is no longer applicable:

DDS uses information exchange, rather than actions, on a Publish/Subscribe basis, on a 'Topic' basis. The topic has a name and contains some parameters, which can take any values.
If an entity wants to receive some information, it needs to subscribe to a topic representing the information, on a filtering basis (topics, parameters, values).
Publish means that topic, or parameter, changes are sent around, in principle to any entity that is listening; this can include multiple entities, not only just one.
An entity should only be listening when it has subscribed to a topic, and when an imposed filter allows the listening.

In software architecture, publish/subscribe is a messaging pattern where senders of messages, called publishers, do not program the messages to be sent directly to specific receivers, called subscribers. Instead, published data is multicasted, without knowledge of what, if any, subscribers there may be. Similarly, subscribers subscribe to particular data, and only receive messages that are of interest, without knowledge of what, if any, publishers there are.

So DDS is data-object (Topic) based instead of message based. The paradigm is different from message based:
In 'message-based', action messages are triggering a status change in an entity.
In 'Data-based' (e.g. DDS), entities signal the session state, and properties, to other subscribed entities, which will cause such entity to act, and publish also an 'Updated' session state, and properties, again to subscribed entities.

SUMMARY OF THE INVENTION

The network for multimedia control comprises User Interfaces, Session Controllers and Media Endpoints as functional entities for initiating a session, the entities having each publisher and/or subscriber functionality and communicating on topics. The network utilizes in particular the topics:

Session State Create Request, Session State Request, Session State Media Endpoint State and Media Endpoint Request.

In an aspect of the invention, the User Interfaces act as an outgoing or incoming interface, the Session Controllers act for an outgoing or incoming session, and the Media Endpoints act as a sending or a receiving endpoint, wherein the Media Endpoints are controlled by the User Interfaces. The network is in a preferred embodiment a Data Distribution Service for Real-Time Systems (DDS) network and the entities act as Domain Participants of the DDS network for providing multimedia signalling control as a domain of the DDS network. The Domain Participants used within the DDS network are: Initiating User Interface, Outgoing Session Controller, Terminating User Interface, Incoming Session Controller, Sending Media Endpoint, and Receiving Media Endpoint.

The invention describes further a method for initiating a session within the network, comprising the steps of starting a session by using an initiating User Interface, the initiating User Interface requesting the creation of the session to a Session Controller, wherein the Session Controller acts as an outgoing Session Controller during the rest of the session. The outgoing Session Controller creates in a further step the session by providing a Session State topic, which is set to an idle state, and the outgoing session controller communicates the Session State topic to the network via a message including session parameters for the session, The initiating User Interface receives the Session State topic and enters an idle state for the session, and the initiating User Interface communicates the Session State change by using a message including an Outgoing Session State Identification number as a parameter in the message. In further steps, an incoming Session Controller is allocated to the outgoing Session Controller, and the outgoing Session Controller passes the session parameters via the incoming Session Controller to a Terminating User interface. The session parameters include in particular a Session Reference number being a unique identification number within the network.

BRIEF DESCRIPTION OF THE DRAWINGS

Preferred embodiments of the invention are explained in more detail below by way of example with reference to schematic drawings, which show:

FIG. 4 a table indicating the relations between domain participants and topics,

DETAILED DESCRIPTION OF PREFERRED EMBODIMENTS

In the following description, a DDS network for multimedia control is described. The DDS network provides a signalling for setting up sessions and related multimedia connections. In a preferred embodiment, the DDS network is implemented within a home network. For purposes of explanation, numerous specific details are set forth in order to provide a thorough understanding of the embodiments. It will be evident, however, to one skilled in the art that the present invention may be practiced without these specific details.

The domain of the DDS network is the multimedia signalling control and the entities, the domain participants of the DDS network, are:

Initiating User Interface (iUI), D1
Terminating User Interface (tUI), D2
Outgoing Session Controller (oSC), D3
Incoming Session Controller (iSC), D4
Sending Media Endpoint (sME), D5
Receiving Media Endpoint (rME), D6

Figure 1B:
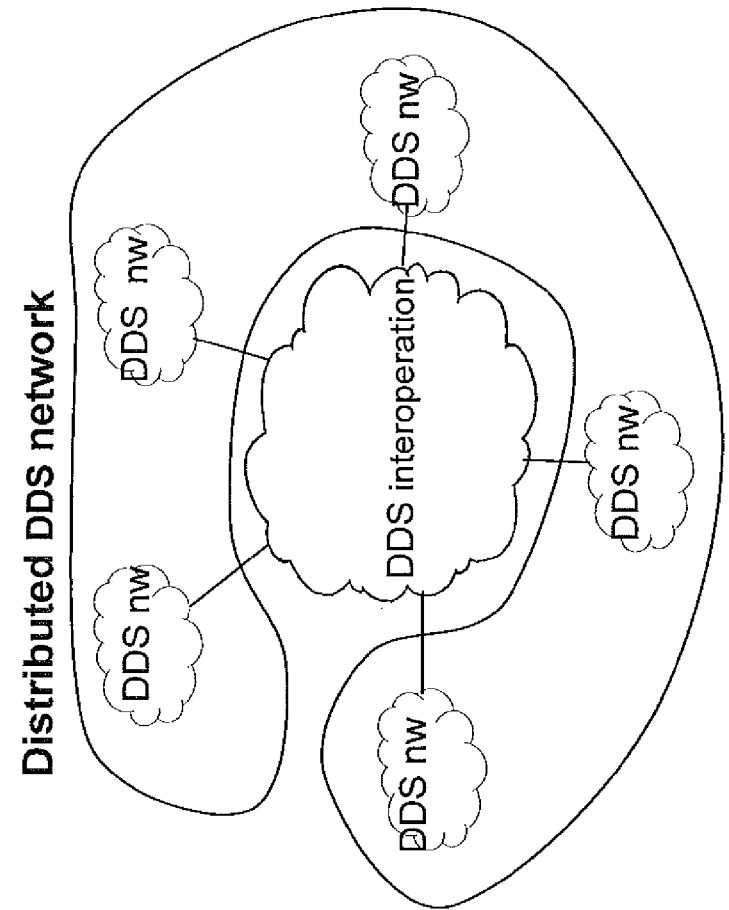
FIG. 1b a distributed DDS network
Figure 1A:
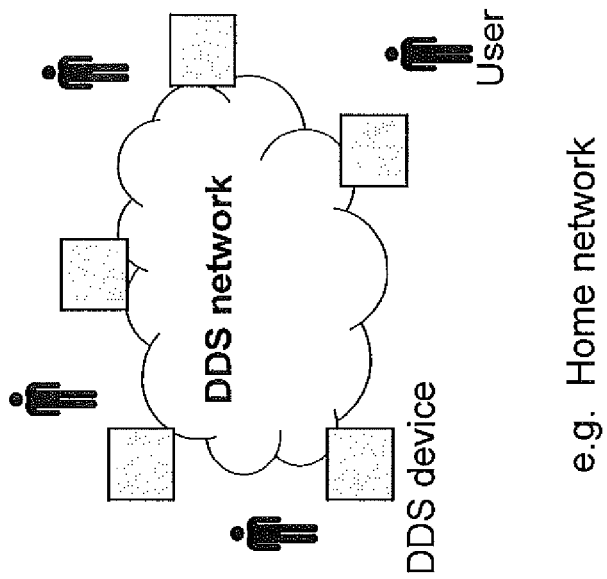
FIG. 1a a DDS home network
Figure 2:
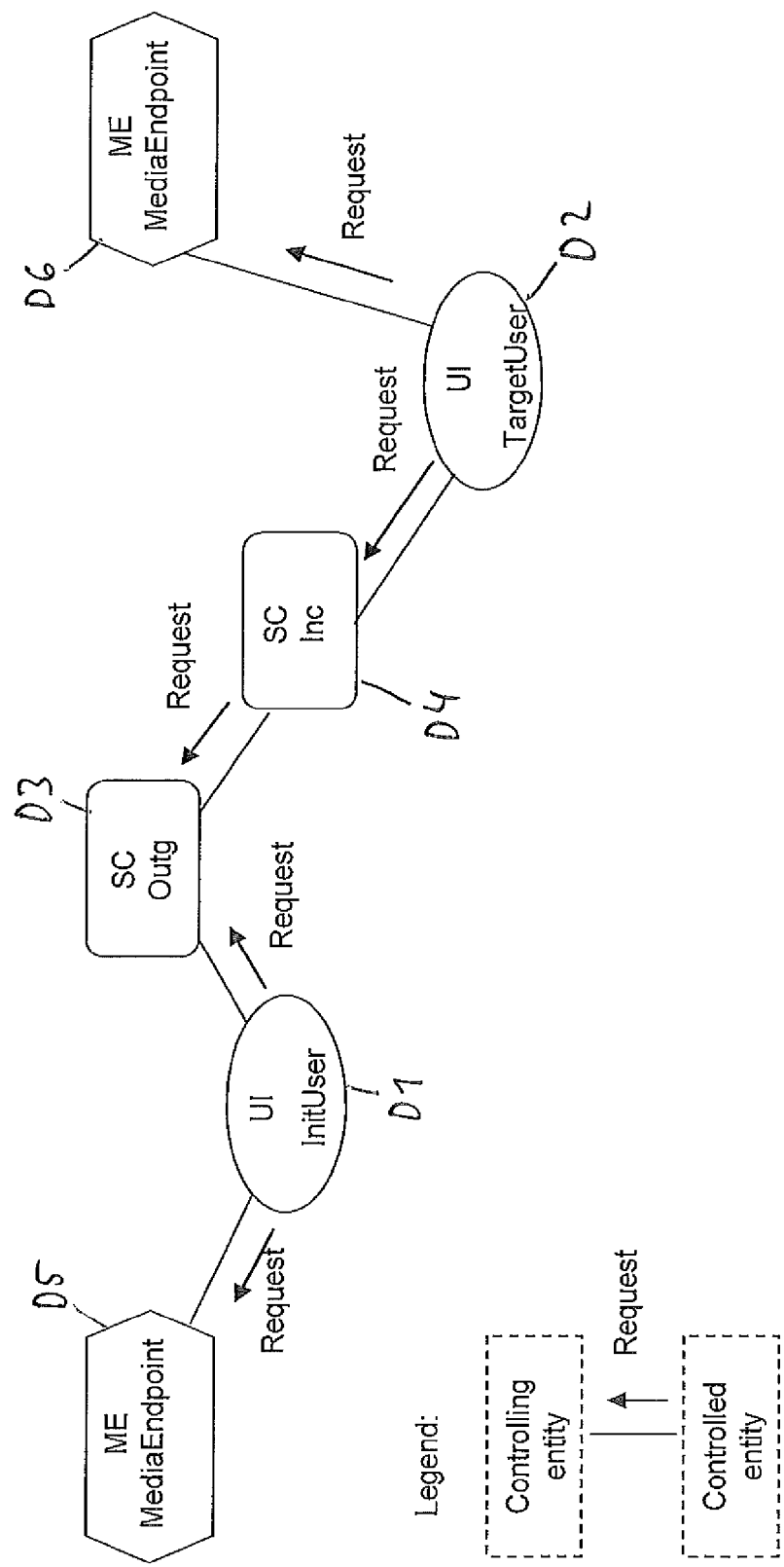
FIG. 2 a hierarchy for entities in a session over a DDS network.

Within a session, there is a hierarchy between these entities, as shown in FIG. 2. The upper entities, the Media Endpoints D5, D6 and the Outgoing Session Controller D3, are controlling the lower entities, the User Interfaces D1, D2 and the Incoming Session Controller D4. The network is in a preferred embodiment preconfigured which entities can operate with which other entities.

The Topics used within the DDS network are:

Session State Create Request T1
 A topic to create a Session State; topic keys are the Initiating User and the Session Reference.
Session State Request, T2
 A topic for an entity to ask its controlling entity for allowance to change a Session State.
Session State, T3
 Topic to signal a Session State change in an entity; the entity publishes this Session State change to a controlled entity.
Media Endpoint Request, T4
 A topic for a User Interface entity to ask a Media Endpoint entity for allowance to change a Media Endpoint State.
Media Endpoint State, T5
 A topic for a Media Endpoint to indicate its state and capabilities to a User Interface entity; the Media Endpoint entity publishes this Media Endpoint information.

Figure 3:
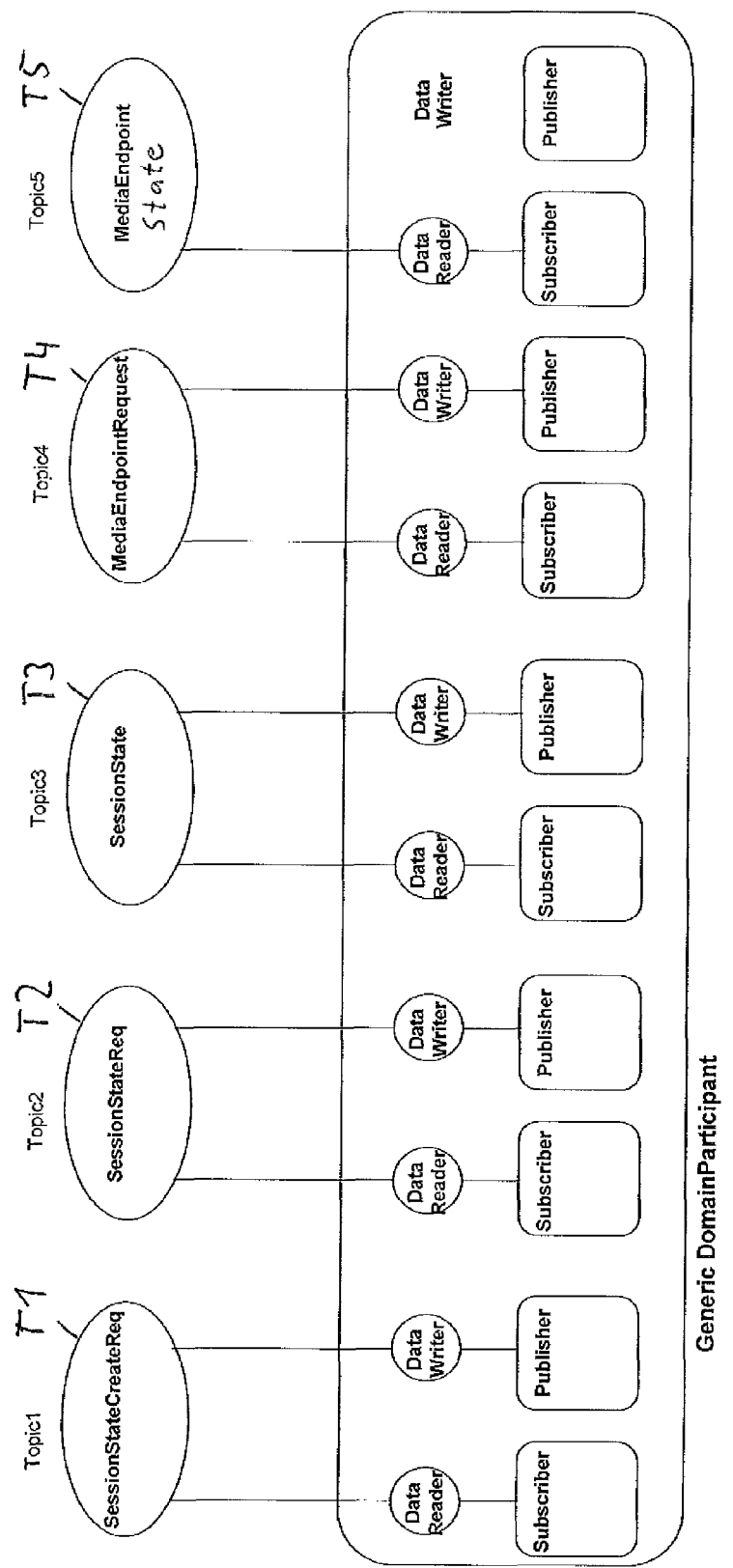
FIG. 3 a generic structure of a domain participant.

Each of the Domain Participants D1-D6 is based on a generic structure as shown in FIG. 3. A generic Domain Participant has a data reader acting as a subscriber and a data writer acting as a publisher for each topic T1-T5, and the Domain Participants communicate with each other by using a publish/subscribe mechanism. But not each Domain Participant uses a topic including a data reader endpoint for subscribing and a data writer endpoint for publishing. Also, not each Domain Participant requires each topic. The table 1 as shown in FIG. 4 indicates which Domain Participant uses which publish and/or subscribe endpoints of each of the topics T1-T5.

The Control Architecture for multimedia control of the DDS network contains User Interfaces, Session Controllers, and Media Endpoints. Multiple Media Endpoints can be controlled by multiple User Interfaces. Multiple Session Controllers can handle sessions for multiple User Interfaces. This is based upon configurations and subscriptions.

Figure 5:
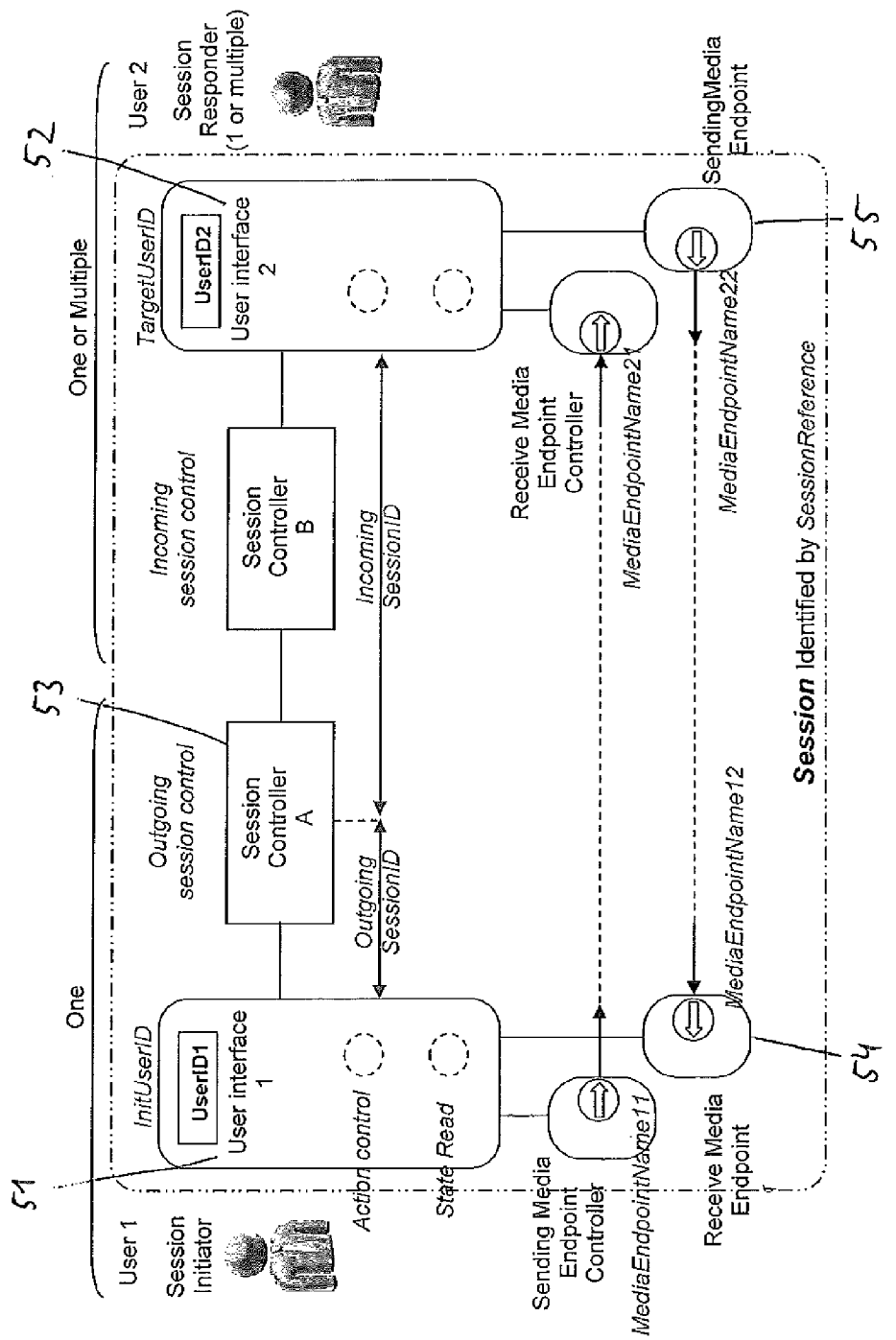
FIG. 5 a DDS multimedia session with two users and one bidirectional connection, FIG. 6 a first embodiment for a DDS network, FIG. 7 a second embodiment for a DDS network, FIG. 8 a creation of a new Session State for a DDS network, FIG. 9 a state change of a DDS network from an INIT state to a CONNECTED state, FIG. 10 a state diagram of an incoming session, FIG. 11a a flow diagram for initializing a session between two user interfaces, FIG. 11b a flow diagram for an allocation of media endpoints for a session according to FIG. 11a, FIG. 12 a flow diagram for a termination of the session according to FIG. 11a by the first user, and FIG. 13 a flow diagram for a termination of the session according to FIG. 11a by the second user.

A general example is depicted in FIG. 5, which shows a DDS multimedia session with two users and one bidirectional connection. The FIG. 5 shows a conceptual scheme indicating relations, and in no way the figure represents communication links. All communication is multicast via publish messages over a DDS bus. The FIG. 5 shows only functional entities, and in no way the FIG. 5 shows entities in devices. Some entities can be grouped in devices, or entities may be in quite different devices. For example, a User interface may be on a tablet, the Session Controller may be in a gateway, and the media endpoints may be in a set-top box.

The sessions are dynamic. The session shown in FIG. 5 is started by a User 1, via a User Interface 51 assigned to User 1. The session represented by a topic 'Session State' is first created, and the only functional entity involved in it is the entity User Interface 51, the Initiating User Interface. Later in the session, other entities like an outgoing Session Controller 53 and more, become part of the session. When the session is ended, the session is deleted. The communication between the user interfaces 51, 52 is done between the sending and receiving media endpoints 54, 55.

Therefore, different Session Controllers are used for a session: an outgoing Session Controller and an incoming Session Controller. Each session includes an outgoing Session Controller assigned to an Initiating User Interface and an incoming Session Controller assigned to a Terminating User Interface. A Media Endpoint is an unidirectional endpoint which is either sending or receiving. As such there are 2 types of Media Endpoints:

A Send Media Endpoint (SendMediaEndpoint)
A Receive Media Endpoint (ReceiveMediaEndpoint)
A bidirectional connection consists correspondingly of four Media Endpoints: Send+Receive on one side and Send+Receive on the other side.

Figure 6:
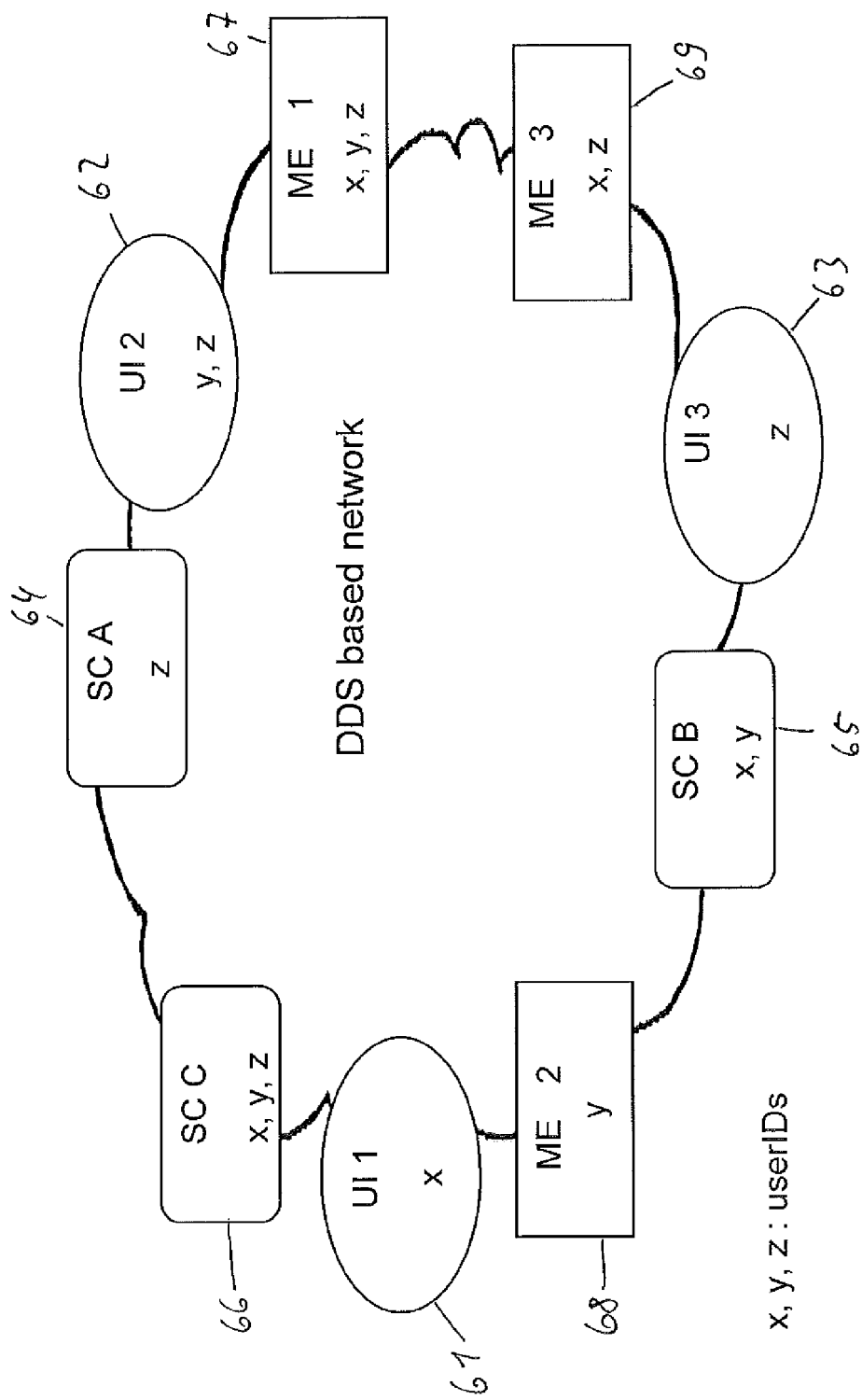

An embodiment for a DDS network is shown in FIG. 6: The DDS network includes user interfaces 61-63, session controllers 64-66 and media endpoints 67-69. The session controllers 64-66 are arranged for example within a residential gateway, the user interface 61 and the media endpoint 68 within a laptop computer, the user interface 62 and the media endpoint 67 within a set-top box and the user interface 63 and the media endpoint 69 within a tablet PC.

The Media Endpoints 67-69 of the DDS network can be viewed by all user interfaces 61-63 of the network. But based on the configuration, some user interfaces just see a limited amount of endpoints, usually the ones that are reasonable to control, e.g. the ones in the same device as the user interface. So a User Interface x, 61, can check the status of Media Endpoints 67 and 69, and can allocate these endpoints for a connection. The User Interface 61 can be supported by Session Controllers 65 and 66, but not by the Session Controller 64, as indicated by the user ID x.

Communication among user interfaces in the DDS network is not based on particular session controllers. A user interface may request a session handling to all Session Controllers, but only the ones which are configured to serve the user interface will see the request, and only one Session Controller will take the request for the rest of the session handling, mainly based on a session reference. Even after allocation of a session controller to serve, data changes will be multicasted to all session controllers, but only the one handling the session will react.

For a particular connection, a user interface may send a reservation or activation request to one particular Media Endpoint. This is either based on the Configuration, or on a Selection by a user on the respective user interface.

The DDS network for multimedia control contains the functional entities: User Interfaces, Session Controllers, and Media Endpoints. These functional entities may in principle be located in any equipment, end equipment or network equipment. However it is likely that User interfaces and Media Endpoints are located in end-devices like PCs, tablets, STBs, . . . and Session Controllers are located in Networking Equipment like home gateways, . . . . But Session Controllers may exist also in separate devices like a Call Controller Device, and User Interfaces and Media Endpoints may exist also in a Home Gateway.

Figure 7:
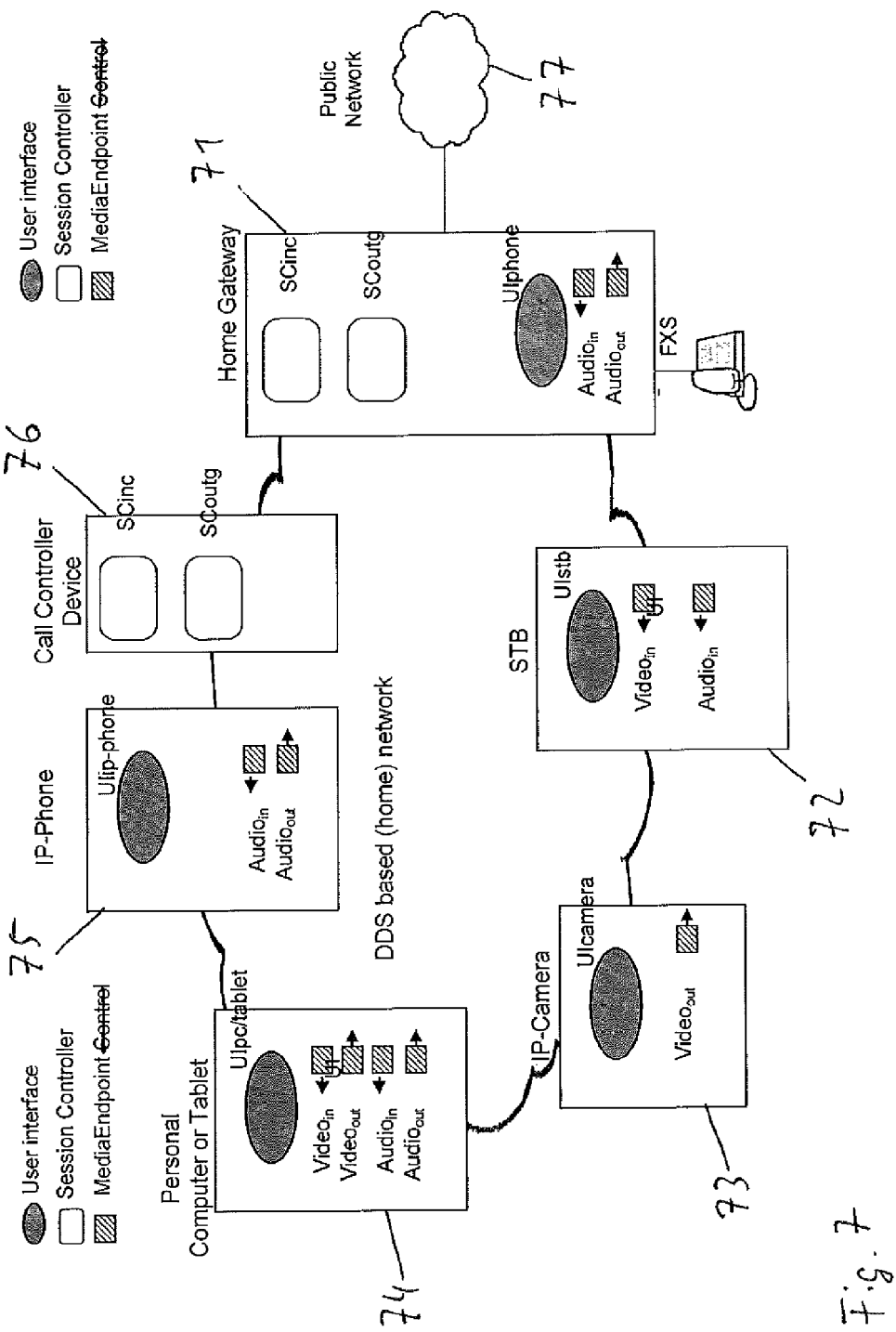

The FIG. 7 shows as a further embodiment a DDS network configured as a home network, including a home gateway 71 and end devices: a Personal Computer (PC) or Tablet 74, a set-top box (STB) 72, an Internet (IP) telephone 75 and an IP-Camera 73. All end-devices 72-55 include a User Interface and Media Endpoints:

PC/Tablet: VideoIn, VideoOut, AudioIn and AudioOut (multiple of such Endpoints may be present)
STB: VideoIn, AudioIn
IP-phone: AudioIn and AudioOut
IP-camera: VideoOut The home gateway 71 is Customer Premises Equipment and acts as a gateway interface to a public network 77. However, some end device functionality, like a FXS telephony service, may be integrated also in the home gateway 71. The home gateway includes therefore corresponding Audio-In and Audio-Out Media endpoints related to the FXS Telephony interface. Ingoing and outgoing Session Controller functionality is included in the home gateway 71 as well as in a Call Controller device 76.

Figure 8:
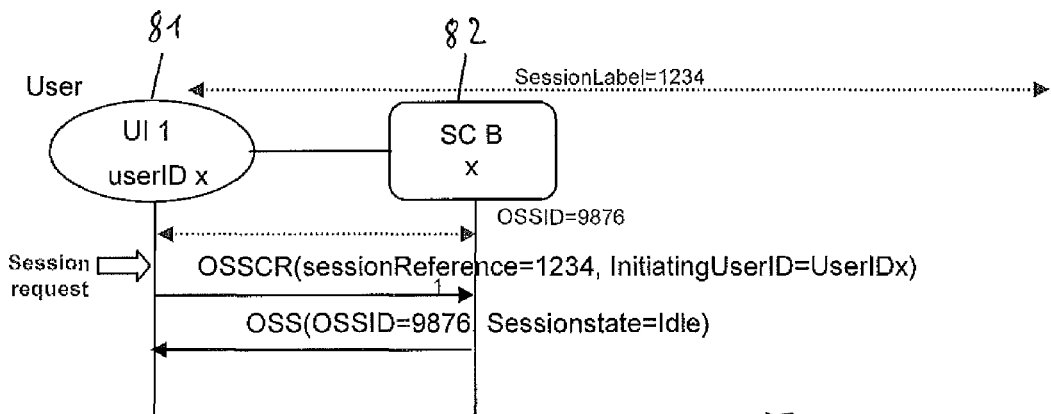

A method for initiating a session, using the topic: Create a new Session State: Session State Create Request, is shown in a message flow diagram in FIG. 8. The Session State is identified by a Session Reference number 1234. The legend for the message flow in FIG. 8, used also in the following figures, is as follows:

O: Outgoing
I: Incoming
SS: SessionState
C: Create
R: Request
ID=Identifier

Once a user 81 wants to start a session, he does this via the user interface UI1. The user interface UI1 requests the creation of the session to the Session Controllers of the DDS network, and one not being busy will accept and will then serve as an outgoing Session Controller 82 during the rest of the session control. Essential to a session creation is the Session Reference, in this case 1234, and the Initiating User, user 81. It must be assured that the Session Reference is a unique number within the DDS network, e.g. a unique user ID based on date and time.

The Session Controller 82 creates a Session via a Session State topic, which is set to Idle state. The session controller 82 communicates the Session State topic, which is a data object, to the DDS network, where the user interface UI 1 sees it and enters the Idle state for the session. When communicating the Session State change, the Outgoing Session State ID, in this case 9876, is also included in the message.

An outgoing Session Controller needs an incoming Session Controller, one for each user interface. The session parameters are passed to the Terminating User interface. An incoming Session State Topic has to be created, via a Session State Create Request topic. Media parameters are communicated to the Terminating User interface.

Figure 9:
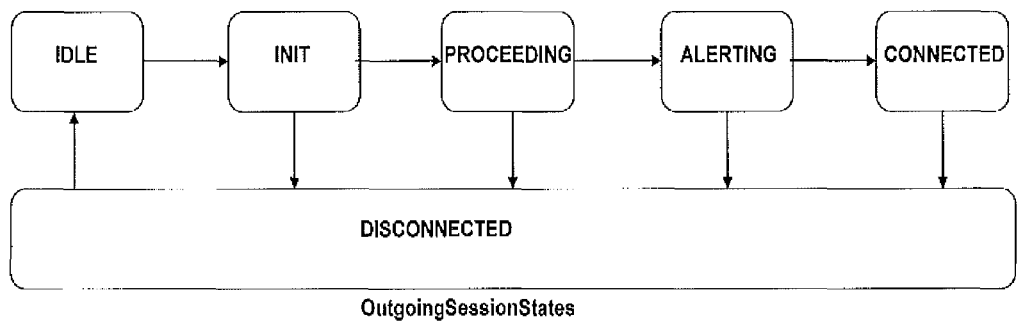
Figure 10:
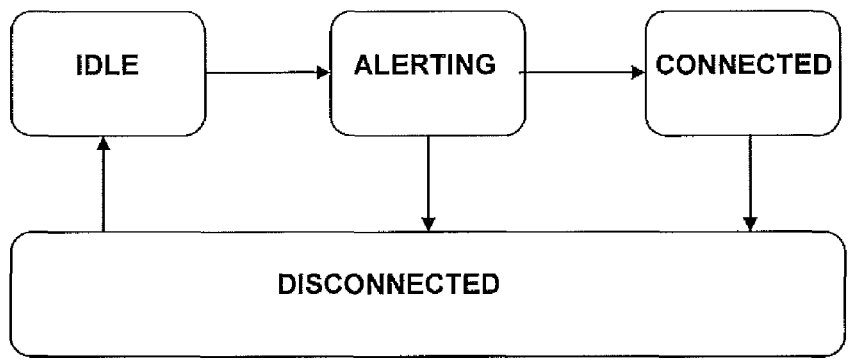

How a session is brought from an INIT state to a CONNECTED state to realize a session among users is depicted in a state diagram in FIG. 9. An initiating user needs an outgoing Session Controller for distributing the session to one or multiple terminating users, as explained with regard to FIG. 5. This is the reason why incoming and outgoing session states and respective session controllers are considered. A state diagram of an incoming session is shown in FIG. 10.

Figures 11A, 11B:
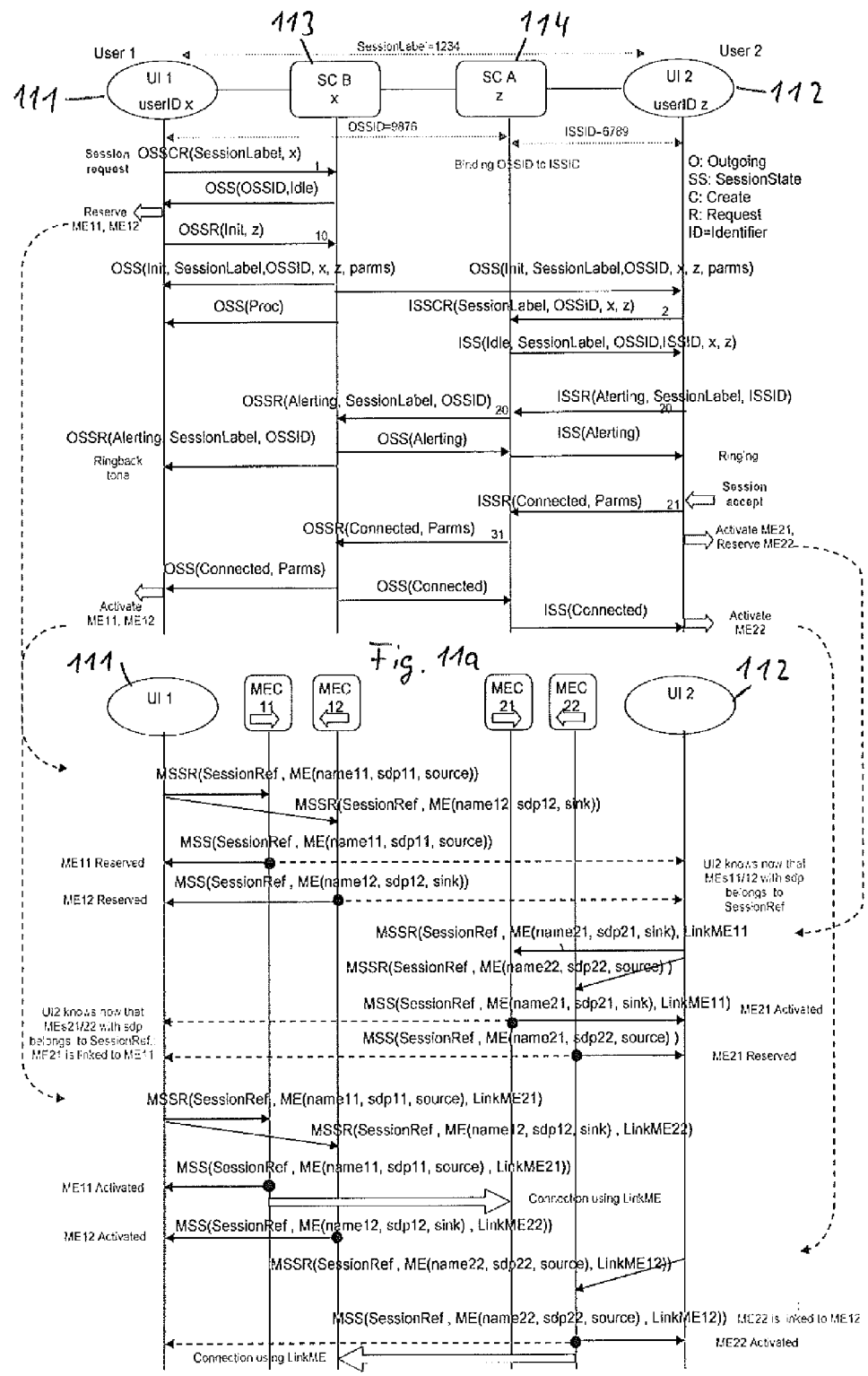

FIG. 11a shows details, how a session is initialized between two user interfaces 111 and 112 by using an outgoing session controller 113 and an incoming session controller 114. After initialization of the session, respective media endpoints MEC 11, MEC 12 are allocated and activated by the user interface 111 and media endpoints MEC 21, MEC 22 by the user interface 112, as shown in FIG. 11b.

The initialization of the session between the two user interfaces 111 and 112 is as follows: A User 1 with a UserID x uses the User Interface 111 and wants to setup a session to another user, user 2, with userID z at User Interface 112. For simplification, no media connection requests are considered in this scenario. The method is based on publishing of Topics. The Topics in bold below are published by the entities: User Interface 111, User Interface 112, outgoing session controller 113, and incoming session controller 114, and based on some properties of the Topics, to which the entities are subscribed. These entities will react on the respective topics. Some of the subscriptions are already there, e.g. User Interface 112 will handle UserID z, but some subscriptions are done during the session setup, e.g. to the created Incoming/Outgoing SessionStateIDs. The key properties in the Topics are underlined below.

The User 1 with UserID x starts the User Interface 111, e.g. by opening a related web page, and starts the session, e.g. by pushing a web page button called 'Media Session Start'. The User Interface 111 publishes then for creating an outgoing session the topic Outgoing Session Create Request (OutgSessionCreateReq) with parameters (OutgoingSessionCreateReqID=1, InitUserID=x, Sessionlabel=1234). The outgoing session controller 113 is one of the session controllers subscribed to the Topic (OutgSessionCreateReq, OSSCR) of userID x; and it publishes the topic Outgoing Session State (OutgSessionState, OSS) with parameters: OutgSessionStateID=9876, InitUserID=x, SessionLabel=1234, OutgSessionState=Idle, TargetUserID=0. This indicates that the topic Session State is created, and a TargetUserID is given.

The User Interface 111 is subscribed now to the topic OutgSessionState having the InitUserID x. The User Interface 111 will delete now via DDS the topic OSSCR after the successful creation of the topic OSS. The User Interface 111 publishes in a further step the topic Outgoing Session State Request (OutgSessionStateReq, OSSR) with parameters: OutgSessionStateReqID=10, OutgSessionID=9876, TargetUserID=z, OutgSessionState=Init, OutgSessionStateReason=create.

The outgoing session controller 113 is subscribed now to the topic OSSR of UserID x, and publishes in a further step the topic OutgSessionState (OSS) with parameters: OutgSessionStateID=9876, InitUserID=x, Sessionlabel=1234, TargetUserID=z, OutgSessionState=Init, OutgSessionStateReason=create to the User Interface 111 and to the User Interface 112. This is a confirmation that the User Interface 112 gets a session request and that the outgoing session controller 113 is subscribed to OutgSessionStateID=9876.

The User Interface 111 is subscribed now to the topic OutgSessionState with InitUserIDx and is notified of the topic OSS(Init); this is a confirmation of the topic OSSR.

The User Interface 112 is subscribed now to the topic OutgSessionState with TargetUserID=z; and publishes in a further step the topic IncSessionStateCreateReq with parameters IncSessionStateCreateReqID=2, Sessionlabel=1234, OutgSessionStateID=9876, InitUserID=x, TargetUserID=z.

The incoming session controller 114 is subscribed now to the topic Incoming Session State Creation Request (IncSessionStateCreationReq) with parameters: TargetUserID=z; and publishes the topic IncSessionState with parameters: IncSessionStateID=6789, Sessionlabel=1234, OutgSessionStateID=9876, TargetUserID=z, InitUserID=x, IncSessionState=Idle. This indicates the binding of OutgSessionStateID=9876 with IncSessionStateID=6789. The incoming session controller 114 is subscribed now to IncSessionStateID=6789, and sets in a further step its state (ISS=incomingSessionState) to idle.

The User Interface 112 is subscribed now to the topic Incoming Session State (IncSessionState) of TargetUserID=z and publishes a topic IncSessionStateReq with parameters: IncSessionReqID=20, Sessionlabel=1234, IncSessionStateID=6789, IncSessionState=Alerting, IncSessionStateReason=create.

The User Interface 112 makes note of IncSessionStateID=6789 for this request and can then forget about OutgSessionStateID=9876; the User Interface 112 subscribes to IncSessionStateID=6789. UI 2 will via DDS delete the ISSCR, since no longer needed.

The incoming session controller 114 is subscribed now to the topic Incoming Session State Request (IncSessionStateReq) of IncSessionStateID=6789; it publishes the topic IncSessionState with parameters: IncSessionStateID=6789, Sessionlabel=1234, IncSessionState=Alerting, IncSessionStateReason=create as a confirmation, and the topic OutgSessionStateReq with parameters: OutgSessionReqID=30, Sessionlabel=1234, OutgSessionID=9876, OutgSessionState=Proc, OutgSessionStateReason=create.

The User Interface 112 is subscribed to the topic IncSessionState with parameter: IncSessionState=6789. The noticed topic IncSessionState with parameters: Alerting, create will cause the User Interface 112 to offer Ringing to the User 2.

The outgoing session controller 113 is subscribed now to the topic OutgSessionStateReq with parameter: OutgSessionID=9876; it publishes the topic OutgSessionState with parameters: OutgSessionStateID=9876, Sessionlabel=1234, OutgSessionState=Proc, OutgSessionStateReason=create to the User Interface 111 and to the incoming session controller 114.

The User Interface 111 UI1 is subscribed now to the topic OutgSessionState with parameter: ID=9876; it will apply a Ringback tone on notification of the sessionstate PROCEEDING. The User 2 accepts the session, e.g by clicking a 'Media Session Accept' button on his User Interface. The Media Endpoints are connecting, for sending or receiving, as soon as the session enters the 'Connected' session state.

The handling of the Media Endpoints is done by the respective User Interfaces 111, 112, as shown in FIG. 11b, at particular points in the session setup communication. It has to be made sure that the activation of the endpoints is such that the receiving endpoint is activated before the endpoint that is sending to it.

Figure 12:
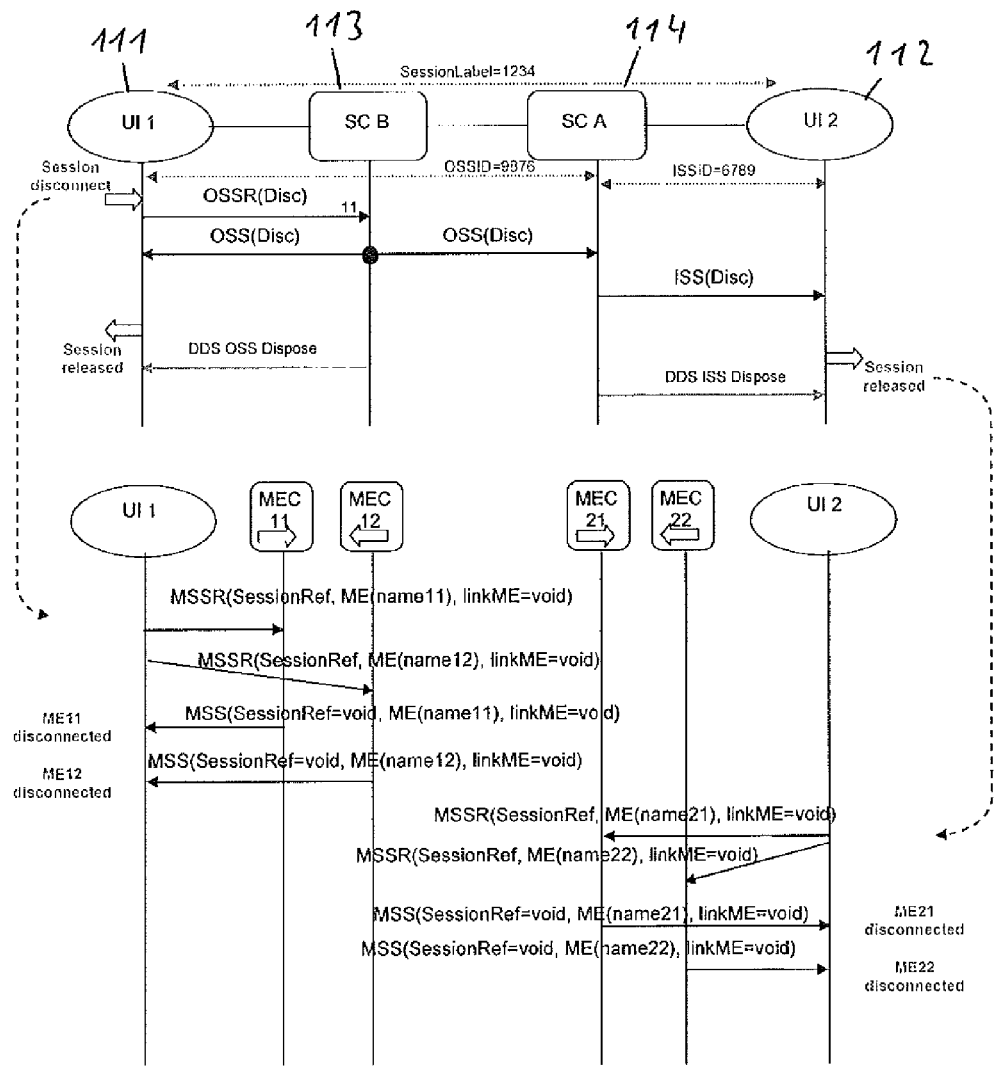
Figure 13:
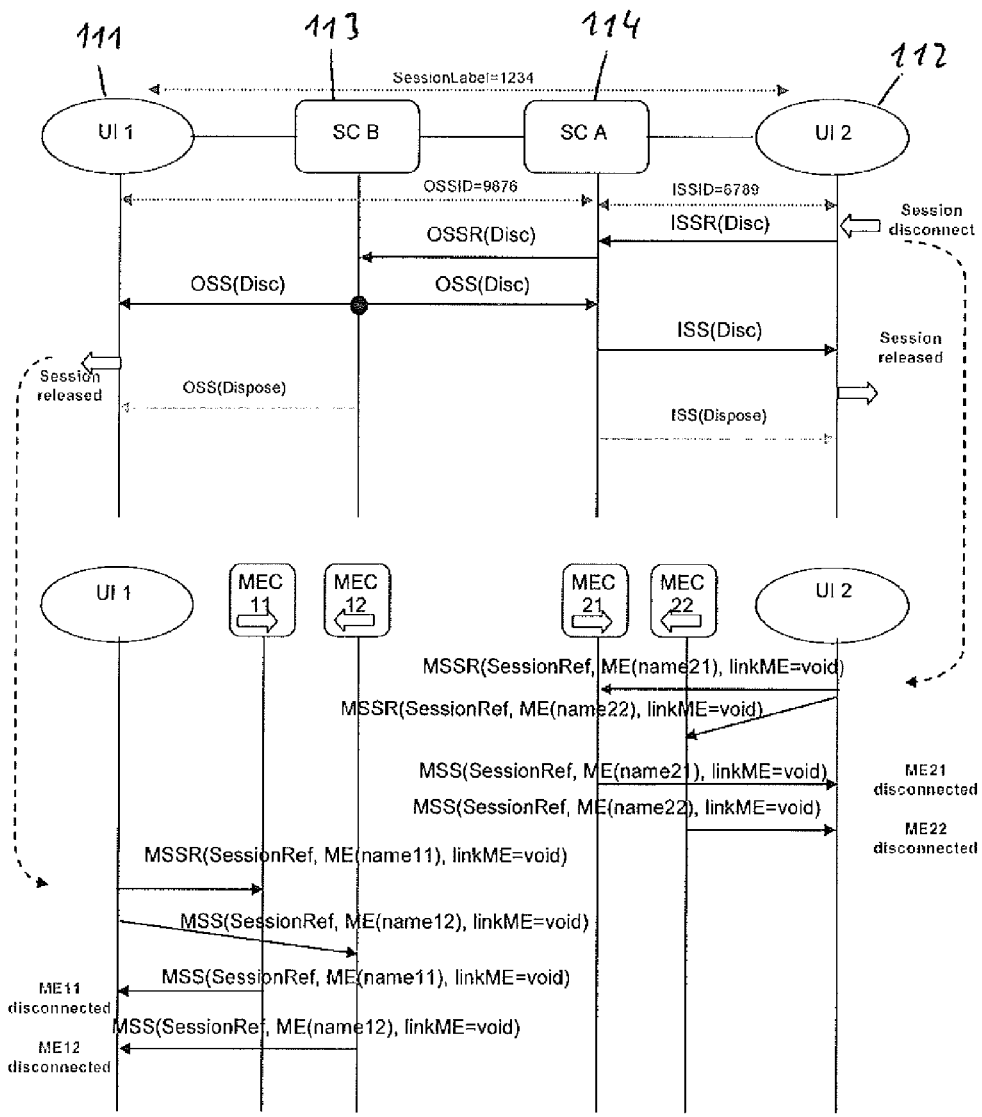

How the session is terminated by the first, the calling user 111, is depicted in FIG. 12. The User 111 ends the session that he has set up to the User 112. He does this e.g. by clicking on a button on his User Interface UI1. How the session is terminated by the second user 112, is depicted in FIG. 13. The User 112 ends the session that was set up by the User 111. He does this e.g. by clicking on a button on his User Interface UI2. The session release between the endpoints is made according to the FIG. 12, respectively FIG. 13. Each of these two scenarios is successive to the session setup scenario as shown in FIGS. 11a, 11b.

It has to be noted that the Proceeding state in the Outgoing session is optional, although, for mapping purposes to SIP (200 Trying) and other protocols, it is advised to support it.

The principles for handling Media Endpoints and connections within a session are the following:

User Interfaces request changes of state (Reserve/Activate) to the MediaEndpoint(s)

Reserve: the endpoint is marked as busy, but no stream sending/receiving is done.

Activate: the endpoint is busy, and media stream sending/receiving is active (in conjunction with a counterpart endpoint—that is why activation can be called 'pairing').

Media endpoints are either sending (source) or receiving (sink).

When pairing Media Endpoints (one source, one sink), the sink must be activated before the source.

The state (and related session info=SessionRef) of Media endpoints is published and all UIs are able to see it in the DDS network that they belong too.

A counterpart of a Media Endpoint (a source for a sink, or a sink for a source) is a reference to another media endpoint with the same sdp parameters parms, but different direction, to which it will be linked; this is identified in the figure as LinkME.

A possible embodiment for a reservation of activation of a Media Endpoint, as shown in the FIGS. 11a, 11b:

When a user interface requests an endpoint to be reserved as part of a session, the SessionRef is included in the request, but the corresponding LinkME is not.

When a user interface requests an endpoint to be activated as part of a session, the SessionRef is included in the request, and also the corresponding LinkME is included.

When a media endpoint publishes its information with SessionRef, but no LinkME information, the endpoint is reserved as part of a session and cannot be used for other session.

When a media endpoint publishes its SessionRef, and also its LinkME information which is not void, then this endpoint is activated and cannot be used for other sessions.

When a media endpoint publishes its SessionRef=void, and also its LinkME=void, then this endpoint is idle and can again be used for other sessions.

Any other embodiment for a reservation of activation of a Media Endpoint can happen by an explicit state-data-item in a topic=Reserved/Activated.

The described DDS network provides in particular a greater network scalability and a more dynamic network topology for home networks and CPE devices. Publishers are loosely coupled to subscribers, and need not even know of their existence. With the topic being the focus of the DDS network, publishers and subscribers are allowed to remain ignorant of system topology. Each can continue to operate normally regardless of the other. In the traditional tightly coupled client-server paradigm, the client cannot post messages to the server while the server process is not running, nor can the server receive messages unless the client is running. Many publish/subscribe systems decouple not only the locations of the publishers and subscribers, but also decouple them temporally. A common strategy used by middleware analysts with such publish/subscribe systems is to take down a publisher to allow the subscriber to work through the backlog (a form of bandwidth throttling).

Publish/subscribe provides also the opportunity for better scalability than traditional client-server networks, through parallel operation, message caching, tree-based or network-based routing, etc. Outside of an enterprise environment, on the other hand, the publish/subscribe paradigm has proven its scalability to volumes far beyond those of a single data centre, providing Internet-wide distributed messaging through web syndication protocols such as RSS and Atom (standard). These syndication protocols accept higher latency and lack of delivery guarantees in exchange for the ability for even a low-end web server to syndicate messages to potentially millions of separate subscriber nodes.

Also other embodiments of the invention may be utilized by one skilled in the art without departing from the scope of the present invention. The network is in a preferred embodiment a DDS network, but also other topic-based publish/subscribe networks may be used according to the invention. The invention resides therefore in the claims herein after appended.

The invention claimed is:

1. A method for initiating a session within a network, comprising:
   starting a session by using an initiating user interface,
   requesting the creation of the session to a session controller by the initiating user interface, the session controller acting as an outgoing session controller during the rest of the session,
   the outgoing session controller creating the session by providing a session state topic, which is set to an idle state,
   the outgoing session controller communicating the session state topic to the network via a message including session parameters for the session,
   the initiating user interface receiving the session state topic and entering an idle state for the session,
   the initiating user interface communicating a session state change via a message including an outgoing session state identification number as a parameter in the message, and
   allocating an incoming session controller to the outgoing session controller, the outgoing session controller passing the session parameters via the incoming session controller to a terminating user interface.

2. The method of claim 1, wherein the session parameters include a session reference number being a unique identification number within the network.

3. The method of claim 1, wherein the network comprises user interfaces, session controllers and media endpoints as functional entities for initiating a session, the entities having each publisher and/or subscriber functionality and communicating on topics.

4. The method of claim 3, wherein the handling of a media endpoint is done by a respective user interface, and a receiving endpoint is activated before an endpoint that is sending to it.

5. The method of claim 1, wherein the network is a Data Distribution Service for Real-Time Systems (DDS) network and the entities act as domain participants of the DDS network for providing multimedia signalling control as a domain of the DDS network.

6. The method of claim 5, wherein the DDS network is implemented within a home network.

7. A network for multimedia control, the network being a Data Distribution Service for Real-Time Systems (DDS) network implemented within a home network, comprising user interfaces, session controllers and media endpoints as functional entities for initiating a session, the entities having each publisher and/or subscriber functionality and communicating on topics, and wherein the entities act as domain participants of the DDS network for providing multimedia signalling control, and wherein the network utilizing the following topics: session state create request in order to request a new outgoing or incoming session state, session state request in order to request a change to a particular outgoing or incoming session state, and session state in order to notify an outgoing or incoming session state change.

8. The network of claim 7, wherein the media endpoints are controlled by the user interfaces.

9. The network of claim 7, wherein the user interfaces act either as an initiating user interface or a terminating user interface, the session controllers act either as an outgoing session controller or an incoming session controller, and the media endpoints act either as a sending media endpoint or a receiving media endpoint.

10. The network of claim 7, including the further topics: media endpoint request as a topic for a user interface entity to ask a media endpoint entity for allowance to change a media endpoint state, and media endpoint state as a topic for a media endpoint to indicate its state and capabilities to a user interface entity, the media endpoint entity publishing a media endpoint information.

11. The network of claim 7, wherein different session controllers are used for a session, an outgoing session controller and an incoming session controller.

12. The network of claim 11, wherein each session includes an outgoing session controller assigned to an initiating user interface and an incoming session controller assigned to a terminating user interface.

13. The network of claim 7, wherein the network is preconfigured which entities can operate with which other entities.

14. The network of claim 7, wherein the following domain participants are included in the DDS network: initiating user interface, outgoing session controller, terminating user interface, incoming session controller, sending media endpoint, and receiving media endpoint.

15. A device utilizing a Data Distribution Service for Real-Time Systems (DDS) for a communication with another device within a network, the device comprising at least a memory and one or more processors, wherein the one or more processors are configured to:

provide functionalities of a user interface, a session controller and a media endpoint, the user interface and the session controller being adapted to communicate on topics, wherein, for initiating a session, the user interface is adapted to operate as an initiating user interface for starting a session, the session controller is adapted for operating as an outgoing session controller and the outgoing session controller requesting the creation of the session by providing a session state topic and to communicate the session state topic to the home network via a message including session parameters for the session, and the initiating user interface is adapted to receive the session state topic and to enter an idle state for the session.

16. The device of claim 15, wherein the session parameters include a session reference number being a unique identification number within the network.

17. The device of claim 15, wherein the network comprises user interfaces, session controllers and media endpoints as functional entities for initiating a session, the entities having each publisher and/or subscriber functionality and communicating on topics.

* * * * *